(12) United States Patent
Watkins

(10) Patent No.: US 7,370,469 B2
(45) Date of Patent: May 13, 2008

(54) ROCKET CHAMBER HEAT EXCHANGER

(75) Inventor: William B. Watkins, Tequesta, FL (US)

(73) Assignee: United Technologies Corporation, Hartford, CT (US)

( * ) Notice: Subject to any disclaimer, the term of this patent is extended or adjusted under 35 U.S.C. 154(b) by 233 days.

(21) Appl. No.: 11/011,314

(22) Filed: Dec. 13, 2004

(65) Prior Publication Data

US 2008/0028762 A1   Feb. 7, 2008

(51) Int. Cl.
   *F02K 9/64* (2006.01)
   *F28D 7/10* (2006.01)
(52) U.S. Cl. .................. 60/267; 60/266; 165/154
(58) Field of Classification Search ............. 60/266, 60/267; 165/154; 239/127.1, 127.3
   See application file for complete search history.

(56) References Cited

U.S. PATENT DOCUMENTS

| | | | |
|---|---|---|---|
| 2,705,399 A * | 4/1955 | Sidney .................. | 60/267 |
| 2,956,399 A * | 10/1960 | Beighley .............. | 239/127.1 |
| 3,166,122 A | 1/1965 | Hryniszak | |
| 3,167,909 A * | 2/1965 | Thielman ............. | 239/127.3 |
| 3,190,070 A * | 6/1965 | Neu, Jr. ................ | 60/267 |
| 3,235,947 A * | 2/1966 | Sohlemann ........... | 29/890.01 |
| 3,346,220 A * | 10/1967 | Lemelson ............ | 244/117 R |
| 3,431,973 A * | 3/1969 | Kritzer ................. | 165/172 |
| 3,605,412 A * | 9/1971 | Stockel ................ | 60/260 |
| 3,692,637 A * | 9/1972 | Dederra et al. ...... | 60/267 |
| 4,697,635 A * | 10/1987 | Longsworth et al. | 165/147 |
| 5,690,472 A * | 11/1997 | Lee ...................... | 416/97 R |
| 6,467,253 B1 * | 10/2002 | Haggander ........... | 60/267 |
| 6,591,499 B1 * | 7/2003 | Lundgren ............. | 29/890.01 |
| 6,920,750 B2 * | 7/2005 | Haggander et al. . | 60/267 |
| 2003/0066636 A1 * | 4/2003 | Kawakubo et al. .. | 165/164 |

OTHER PUBLICATIONS

NASA Contractor Report 187207, Thrust Chamber Material Technology Program, J.S. Andrus et al., Mar. 1989.

* cited by examiner

*Primary Examiner*—Ted Kim
(74) *Attorney, Agent, or Firm*—Bachman & LaPointe

(57) ABSTRACT

A rocket engine chamber has a back structure and a heat exchanger structure located radially inwardly of the back structure. The heat exchanger structure has a plurality of integrally formed cooling passageways with adjacent ones of the passageways having a common sidewall structure. Each passageway has a top section which forms the wall that contacts the hot gases. The top section is formed by a wall structure having an inner and outer surface formed by an arc of a circle and a substantially constant wall thickness.

15 Claims, 2 Drawing Sheets

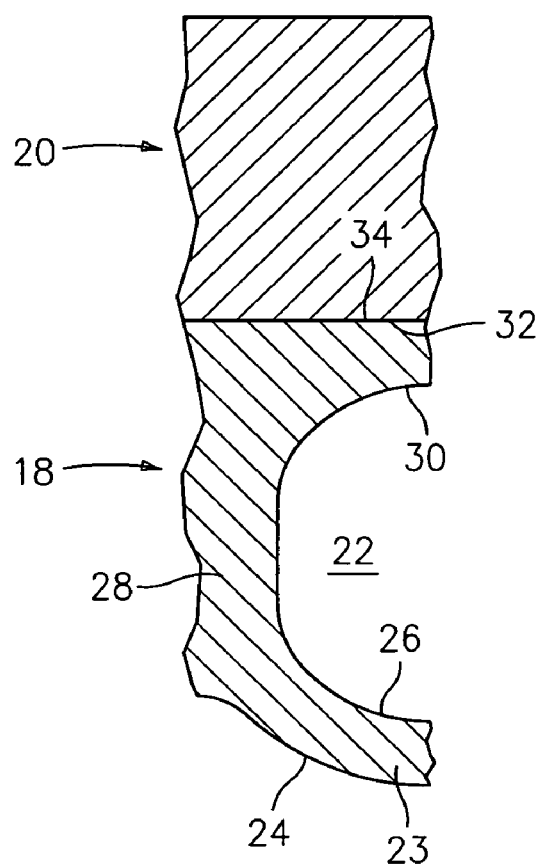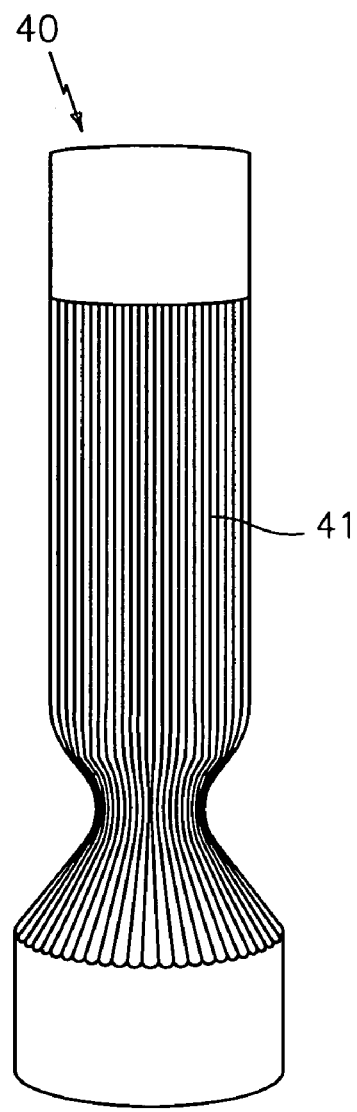
FIG. 3                    FIG. 4

ROCKET CHAMBER HEAT EXCHANGER

BACKGROUND OF THE INVENTION

The present invention relates to liquid rocket engines and specifically re-usable rocket engines which are operated many times.

Most liquid rocket engines have been expendable. That is, when the engine design reaches operational maturity, each production engine is operated probably only twice—once in a ground test to verify that the engine works and a second time when it is flown and expended. The only re-usable liquid rocket engine in operation today is the Space Shuttle Main Engine.

Several U.S. liquid rocket engine combustion chambers are made using tubes. The tubes are bent into the shape of the rocket chamber/nozzle, which is similar to a slice through the familiar "bell" shape. Then the tubes are fixtured in an axisymmetric array and joined together to form the complete chamber/nozzle. To complete the chamber/nozzle, external structure must be added to strengthen the joined tubes, and manifolds must be added at each end of the array of tubes for coolant inlet and discharge. The advantage of a tube is that it is an excellent pressure vessel. The disadvantages however are numerous. Each individual tube must be formed to size and shape to conform to design specifications. Also, it takes a large number to make a complete chamber, in many cases 200 or more. This makes the tubes, essentially the chamber/nozzle raw material, a large cost item. Next the tubes and manifolds must be joined in place without leaks. This is very difficult to do without fault, and re-work is often required, further increasing chamber/nozzle cost.

Some liquid rocket engines build the chamber/nozzle in a different way. This method is known as "milled channel with close-out". First, a "bell" is made beginning with flat sheet and rolling/welding or some similar process. Then coolant channels are machined into the bell shaped structure. A second bell which fits over the first one is then made. The second bell is then joined to the first to create the channel close-outs. In similarity with the tubular construction described above, structural stiffeners and inlet/discharge manifolds are then joined in place to complete the chamber. Advantages are that this method can be made to work with fewer parts than with tubes. Disadvantages include the operations used to join different parts. Also, the resulting channel structure is rectangular, with one of the flat walls facing the combustion chamber. The rectangular passage, and especially the flat side of the passage facing the combustion chamber, undergoes plastic deformation while operating. This results in actual thinning of the wall which does not recover original thickness on shutdown. Thinning increases with subsequent use. This phenomena has been termed "ratcheting" by the structures analysts. Overall result is a life-limited structure, with life nominally less than 100 cycles. Tubular chamber construction undergoes similar operational structural deformation, however, not to the same degree as with the milled channel construction, primarily due to the tube acting as an efficient pressure vessel.

An advanced method has been developed to make liquid rocket chambers and nozzles. Specifically, the method is known as vacuum plasma spray and is exemplified by U.S. Pat. No. 5,249,357. This method is equivalent to the milled channel method described above with two primary differences: (1) the "bell" is sprayed on a bell-shaped mandrel beginning with powder raw material and using a high-temperature inert gas stream; and (2) the channel close-outs are similarly sprayed. At this point in time, the method has been used to make only flat wall chambers. These have rectangular cooling channels with one of the flat walls facing the combustion chamber. Fabrication costs are significantly lower than either tubular construction or milled channel with joined close-out, due primarily to using the spray process to create a near net shape, integral (one-piece) chamber/nozzle. The disadvantage of this method is the flat wall facing the combustion chamber and its life-limiting characteristics of deflection and thinning at operation pressure and temperature.

SUMMARY OF THE INVENTION

It is an object of the present invention to provide a rocket engine chamber which is reusable.

It is a further object of the present invention to provide a rocket engine chamber which has cooling passageways which can carry a high pressure coolant without severe structural deformation.

The foregoing objects are attained by the rocket engine chamber of the present invention.

In accordance with the present invention, a rocket engine chamber is provided. The rocket engine chamber has a back structure and a heat exchanger structure located radially inwardly of the back structure. The heat exchanger structure has a plurality of integrally formed cooling passageways with adjacent ones of the passageways having a common sidewall structure. Each passageway has a top section which forms the wall that contacts the hot gases. The top section is formed by a wall structure having an inner and outer surface formed by an arc of a circle and a substantially constant wall thickness.

Other details of the rocket chamber heat exchanger of the present invention, as well as objects and advantages attendant thereto, are set forth in the following detailed description and the accompanying drawings wherein like reference numerals depict like elements.

BRIEF DESCRIPTION OF THE DRAWINGS

FIG. 3 is a sectional view of a portion of the rocket engine chamber; and

FIG. 4 illustrates a mandrel which may be used to form the rocket engine chamber of the present invention.

DETAILED DESCRIPTION OF THE PREFERRED EMBODIMENT(S)

Figure 1:
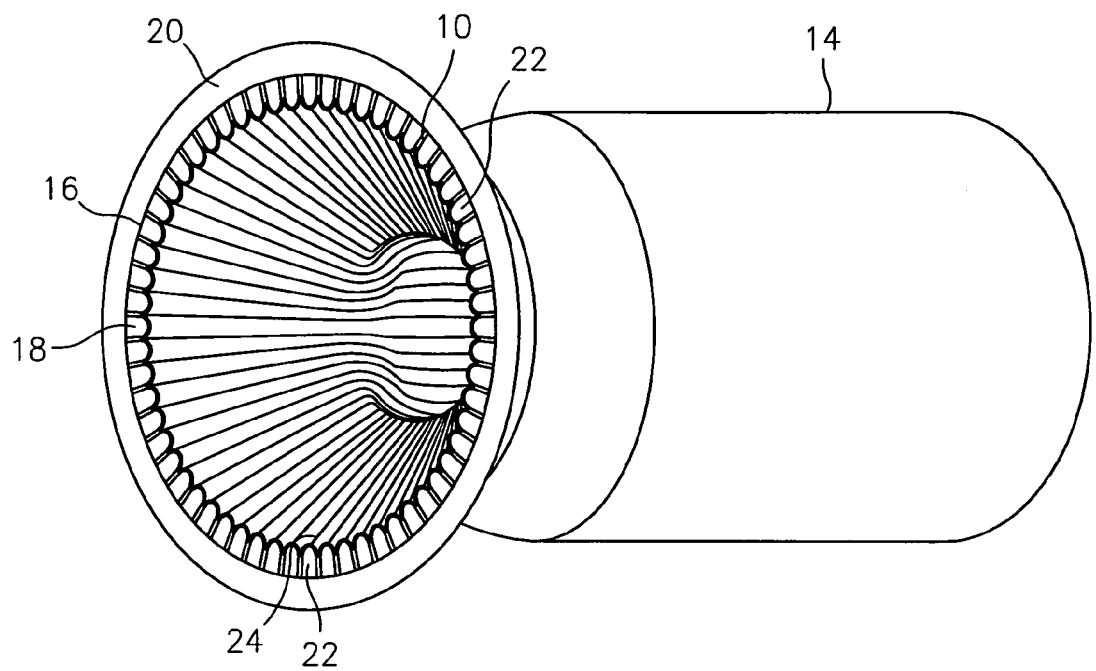
FIG. 1 is a front view of a rocket engine chamber formed in accordance with the present invention.
Figure 2:
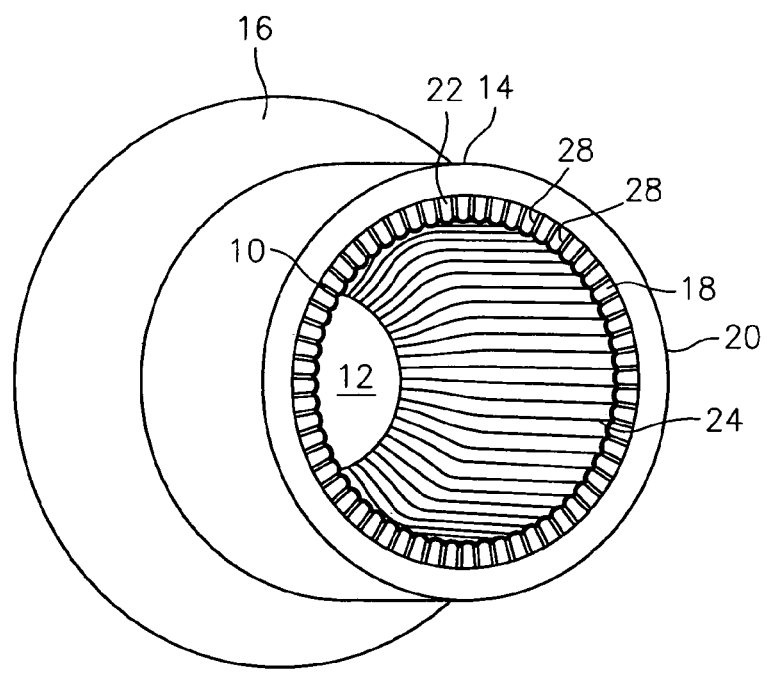
FIG. 2 is a rear view of the rocket engine chamber of FIG. 1.

Referring now to the drawings, FIGS. 1 and 2 illustrate a rocket engine chamber 10 in accordance with the present invention. The chamber 10 has a hollow central portion 12 through which hot gases travel. The chamber 10 further has a chamber section 14 and a nozzle section 16.

The chamber 10 has a heat exchanger section 18 which extends the length of the chamber 10 and a back structure 20 which also extends the length of the chamber 10. The heat exchanger section 18 is located radially inward of the back structure 20. In the heat exchanger section 18 are a plurality of integrally formed cooling passageways 22 through which a coolant, such as rocket fuel, under high pressure travels. The cooling passageways 22 preferably have a circular cross section or a near circular cross section.

The cooling passageways 22 may be formed from any suitable metallic material capable of transferring heat. Preferably, the passageways 22 are formed from a copper based material such as copper or a copper alloy, such as a dispersion strengthened copper alloy. In a most preferred embodiment, the passageways 22 are formed from a GRCop-84 alloy.

The cooling passageways 22 have a top section 23 which includes a hot gas contact surface 24 and an inner surface 26 which contacts the coolant. The surfaces 24 and 26 are each preferably formed by an arc of a circle. The arc extends from one sidewall 28 to an opposite sidewall 28 of the passageway 22. Forming the surfaces 24 and 26 with such a configuration is desirable because it allows the passageways 22 to carry high pressure coolant without severe structural deformation and the consequent tendency for hardware distress and failure. In a preferred embodiment of the present invention the top section 23 has a substantially uniform thickness.

As can be seen from FIGS. 1 and 2, adjacent ones of the cooling passageways 22 have a common sidewall 28. The sidewall 28 is integral with the top section 23 and is formed by the same material. As can be seen from FIG. 3, the sidewall has a non-uniform thickness and is non-circular.

The cooling passageways also have a bottom section 30. Since the bottom section 30 does not come into contact with the hot gases, it does not have to be configured so as to have a shape which is circular, although it could if so desired. The bottom section 30 may have any desired shape. Typically, the bottom section 30 will have a non-uniform thickness and a smooth peripheral surface or closeout 32. The bottom section 30 is integrally formed with the sidewalls 28 and is formed from the same material as the sidewalls 28.

The back structure 20 may be formed from any suitable material known in the art, including, but not limited to, a nickel based alloy, an iron based alloy, and composite materials. The back structure 20 is preferably formed so as to have a smooth peripheral inner surface 34 which mates with the closeout 32 as well as a smooth peripheral outer surface 36. In a preferred embodiment, the surface 34 is joined to the closeout 32.

The rocket engine chamber may be formed using any suitable technique known in the art. For example, a mandrel 40 machined with circular cross-section grooves 41, such as that shown in FIG. 4, may be used to form the heat exchanger section 18. The heat exchanger section 18 may be formed as a solid piece onto the mandrel with the surfaces 24 of the fluid passageways 22 being formed by the grooves 41. The copper based material forming the heat exchanger section 18 may be deposited onto the mandrel 40 using any suitable technique known in the art such as vacuum plasma spraying. After the heat exchanger section 18 has been deposited on the mandrel 40, the back structure 20 may be formed using any suitable deposition technique known in the art such as vacuum plasma spraying.

The interior 42 of the cooling passageways 22 may be machined into the copper base material deposit forming the heat exchanger section 18 using any suitable technique known in the art.

Closeouts 32 may be applied with vacuum plasma spray or any other suitable technique known in the art. The closeout 32 will be flat rather than circular because this region is both cold and supported by the back structure.

If desired, the rocket engine chamber 10 may be formed using a combination of fabrication methods such as a spin-formed shell with machined cooling passageways and machined circular cross section inner surfaces.

As can be seen from the foregoing discussion, the rocket engine chamber 10 of the present invention is quite different from the construction of prior art rocket engine chambers. No tubes are used. Thus, there is no need to join the tubes together and a cost saving is effected.

Rocket engine chambers in accordance with the present invention may have a minimum life of 250 cycles before distress is encountered.

It is apparent that there has been provided in accordance with the present invention a rocket chamber heat exchanger which fully satisfies the objects, means, and advantages set forth hereinbefore. While the present invention has been described in the context of specific embodiments thereof, other alternatives, modifications, and variations will become apparent to those skilled in the art having read the foregoing description. Accordingly, it is intended to embrace those alternatives, modifications, and variations which fall within the broad scope of the appended claims.

What is claimed is:

1. A rocket engine chamber comprising:
a back structure and a heat exchanger structure located radially inwardly of said back structure;
said heat exchanger structure comprising a plurality of integrally formed cooling passageways with adjacent ones of said passageways having a common sidewall structure;
said heat exchanger structure being formed from a copper based material;
each of said passageways having a top section which includes a hot gas contact surface which contacts hot gases flowing through said rocket engine chamber and an inner surface which forms part of a respective passageway;
each of said contact surface and said inner surface being formed by an arc of a circle which extends from one sidewall of said respective passageway to an opposite sidewall of said respective passageway;
each of said sidewalls being non-circular and having a non-uniform thickness;
each of said passageways having a bottom section;
said bottom surface having a non-uniform thickness and a smooth peripheral surface; and
said back structure having a smooth inner peripheral surface which mates with the smooth peripheral surface of the bottom section.

2. A rocket engine chamber according to claim 1, wherein each of said passageways has a near circular cross-section.

3. A rocket engine chamber according to claim 1, wherein each of said passageways has a circular cross-section.

4. A rocket engine chamber according to claim 1, further comprising a chamber section and a nozzle section and each of said passageways extending through said chamber section and said nozzle section and forming an inner surface of said chamber and nozzle sections.

5. A rocket engine chamber according to claim 1, wherein said cooling passageways are machined cooling passageways.

6. A rocket engine chamber according to claim 1, wherein said cooling passageways are formed from a sprayed copper material.

7. The rocket engine chamber according to claim 1, wherein said hot gas contact surface has a scalloped configuration.

8. The rocket engine chamber according to claim 1, wherein said back structure and said heat exchanger structure are annular.

9. The heat exchanger structure according to claim 1, wherein said copper based material is a dispersion strengthened copper alloy.

10. The heat exchanger structure according to claim 1, wherein said copper based material is GRCop-84 copper alloy.

11. A heat exchanger structure comprising:
a plurality of integrally formed cooling passageways with adjacent ones of said passageways having a common sidewall structure;
said heat exchanger structure being formed from a copper based material;
each of said passageways having a top section which includes a hot gas contact surface which contacts hot gases flowing through a chamber and an inner surface;
each of said contact surface and said inner surface being formed by an arc of a circle which extends from one sidewall of a respective passageway to an opposite sidewall of the respective passageway;
each of said sidewalls being non-circular and having a non-uniform thickness;
each of said passageways having a bottom section;
said bottom surface having a non-uniform thickness and a smooth peripheral surface; and
a back structure having a smooth inner peripheral surface which mates with the smooth peripheral surface of the bottom section.

12. A heat exchanger structure according to claim 11, wherein each of said passageways has a near circular cross-section.

13. A heat exchanger structure according to claim 11, wherein each of said passageways has a circular cross-section.

14. The heat exchanger structure according to claim 11, wherein said hot gas contact surface has a scalloped configuration.

15. The heat exchanger structure according to claim 11, wherein said back structure and said heat exchanger structure are annular.

* * * * *